United States Patent
Sarikaya et al.

(10) Patent No.: US 10,339,916 B2
(45) Date of Patent: Jul. 2, 2019

(54) GENERATION AND APPLICATION OF UNIVERSAL HYPOTHESIS RANKING MODEL

(71) Applicant: Microsoft Technology Licensing, LLC, Redmond, WA (US)

(72) Inventors: Ruhi Sarikaya, Redmond, WA (US); Paul Anthony Crook, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/841,156

(22) Filed: Aug. 31, 2015

(65) Prior Publication Data

US 2017/0061956 A1   Mar. 2, 2017

(51) Int. Cl.
  *G10L 15/00* (2013.01)
  *G10L 15/06* (2013.01)
  *G10L 15/18* (2013.01)
  *G06N 3/00* (2006.01)
  *G06F 17/27* (2006.01)

(52) U.S. Cl.
  CPC .......... *G10L 15/005* (2013.01); *G06N 3/006* (2013.01); *G10L 15/063* (2013.01); *G10L 15/1815* (2013.01); *G06F 17/27* (2013.01)

(58) Field of Classification Search
  CPC . G10L 15/005; G10L 15/063; G10L 15/1815; G06N 3/006; G06F 17/27
  USPC ........................................................ 704/205
  See application file for complete search history.

(56) References Cited

U.S. PATENT DOCUMENTS

| | | |
|---|---|---|
| 5,293,584 A | 3/1994 | Brown et al. |
| 5,477,451 A | 12/1995 | Brown et al. |
| 6,122,361 A | 9/2000 | Gupta et al. |
| 6,631,346 B1 | 10/2003 | Karaorman et al. |
| 7,010,484 B2 | 3/2006 | Lin |
| 7,363,215 B1 | 4/2008 | Jamieson et al. |

(Continued)

FOREIGN PATENT DOCUMENTS

| | | |
|---|---|---|
| EP | 1701247 | 9/2006 |
| EP | 2575128 | 4/2013 |

(Continued)

OTHER PUBLICATIONS

U.S. Appl. No. 14/086,897, Office Action and Interview Summary dated Aug. 12, 2016, 4 pgs.

(Continued)

*Primary Examiner* — Bharatkumar S Shah

(57) ABSTRACT

Non-limiting examples of the present disclosure describe generation and application of a universal hypothesis ranking model to rank/re-re-rank dialog hypotheses. An input is received through a user interface of an application for dialog processing. A plurality of dialog hypotheses are generated based on input understanding processing of the received input. The plurality of dialog hypotheses are ranked using a universal hypothesis ranking model that is applicable to a plurality of languages and locales. The ranking of the plurality of dialog hypotheses comprises using the universal hypothesis ranking model to analyze language independent features of the plurality of dialog hypotheses for policy determination. Other examples are also described including examples directed to generation of the universal hypothesis ranking model.

20 Claims, 8 Drawing Sheets

(56) References Cited

U.S. PATENT DOCUMENTS

| | | | |
|---|---|---|---|
| 8,239,207 | B2 | 8/2012 | Seligman et al. |
| 8,275,615 | B2 | 9/2012 | Kozat et al. |
| 8,521,526 | B1 | 8/2013 | Lloyd et al. |
| 2001/0041980 | A1 | 11/2001 | Howard et al. |
| 2003/0200094 | A1 | 10/2003 | Gupta et al. |
| 2003/0233230 | A1 | 12/2003 | Ammicht et al. |
| 2004/0078201 | A1 | 4/2004 | Porter et al. |
| 2006/0004570 | A1 | 1/2006 | Ju et al. |
| 2006/0085192 | A1 | 4/2006 | Davis et al. |
| 2008/0281598 | A1 | 11/2008 | Eide et al. |
| 2009/0018833 | A1* | 1/2009 | Kozat ............... G10L 15/32 704/257 |
| 2010/0138215 | A1 | 6/2010 | Williams |
| 2012/0078888 | A1 | 3/2012 | Brown et al. |
| 2012/0179467 | A1* | 7/2012 | Williams ............ G06F 17/279 704/249 |
| 2012/0265518 | A1 | 10/2012 | Lauder |
| 2013/0018876 | A1 | 1/2013 | Chu-Carroll et al. |
| 2014/0163959 | A1* | 6/2014 | Hebert ............. G06F 16/3344 704/9 |
| 2014/0222422 | A1 | 8/2014 | Sarikaya et al. |
| 2015/0142420 | A1 | 5/2015 | Sarikaya et al. |
| 2016/0350288 | A1* | 12/2016 | Wick ................ G06F 17/2735 |

FOREIGN PATENT DOCUMENTS

| | | |
|---|---|---|
| WO | 1994028541 | 12/1994 |
| WO | 1999044154 | 9/1999 |

OTHER PUBLICATIONS

U.S. Appl. No. 14/086,897, Amendment and Response filed Oct. 12, 2016, 13 pages.
PCT International Preliminary Report on Patentability in International Application PCT/US2016/049338, dated Nov. 25, 2016, 16 pgs.
Crook, Paul A., et al., "Multi-Language Hypotheses Ranking and Domain Tracking for Open Domain Dialogue Systems", Proceedings of the 16th Annual Conferenceof the International Speech Communication Association (INTERSPEECH 2015), Sep. 6, 2015, pp. 1810-1814, Dresden, Germany, 5 pgs.
Fishel, Mark, "Ranking translations using error analysis and quality estimation", Proceedings of the Eighth Workshop on Statistical Machine Translation, Aug. 8, 2013, pp. 405-407, 3 pgs.
Cohen, et al., "Towards a Universal Speech Recognizer for Multiple Languages", In Proceedings of the IEEE Workshop on of the Automatic Speech Recognition and Understanding, Dec. 14, 1997, pp. 591-598.
Hahn, et al., "Comparing Stochastic Approaches to Spoken Language Understanding in Multiple Languages", In IEEE Transactions on Audio, Speech, and Language Processing, vol. 19 , Issue 6, Aug. 2011, pp. 1569-1583.
Robichaud, et al., "Hypotheses Ranking for Robust Domain Classification and Tracking in Dialogue Systems", In Proceedings of 15th Annual Conference of the International Speech Communication Association, Sep. 2014, 5 pages.
Williams, Jason D., "Web-Style Ranking and SLU Combination for Dialog State Tracking", In Proceedings of SIGDIAL Conference, Jun. 18, 2014, pp. 282-291.
Henderson, et al., "The Second Dialog State Tracking Challenge", In Proceedings of SIGDIAL Conference, Jun. 18, 2014, pp. 263-272.
Morbini, et al., "A Reranking Approach for Recognition and Classification of Speech Input in Conversational Dialogue Systems", In Proceedings of IEEE Spoken Language Technology Workshop, Dec. 2, 2012, pp. 49-54.
Basili, et al., "Kernel-Based Discriminative Re-ranking for Spoken Command Understanding in HRI", In Proceedings of XIIIth International Conference of the Italian Association for Artificial Intelligence, Dec. 4, 2013, 4 pages.
Ng, et al., "Dialog Input Ranking in a Multi-Domain Environment Using Transferable Belief Mode", In Proceedings of 4th SIGDIAL Workshop on Discourse and Dialogue, Jul. 5, 2003, 5 pages.
Dinarelli, et al., "Hypotheses Selection Criteria in a Reranking Framework for Spoken Language Understanding", In Proceedings of Conference on Empirical Methods in Natural Language Processing, Jul. 27, 2011, pp. 1104-1115.
Dinarelli, et al., "Discriminative Reranking for Spoken Language Understanding", In Journal of IEEE Transactions on Audio, Speech and Language Processing, vol. 20, Issue 2, Feb. 2012, pp. 526-539.
Cortes, et al., "Support-Vector Networks", In Journal of Machine Learning, vol. 20, Issue 3, Sep. 15, 1995, pp. 273-297.
Xu, et al., "Contextual Domain Classification in Spoken Language Understanding Systems using Recurrent Neural Network", In Proceedings of IEEE International Conference on Acoustics, Speech and Signal Processing, May 4, 2014, 5 pages.
Lafferty, et al., "Conditional Random Fields: Probabilistic Models for Segmenting and Labeling Sequence Data", In Proceedings of Eighteenth International Conference on Machine Learning, Jun. 28, 2001, 10 pages.
Burges, et al., "Learning to Rank Using an Ensemble of Lambda-Gradient Models", In Journal of Machine Learning Research: Workshop and Conference, vol. 14, Feb. 2011, pp. 25-35.
Ballim, et al., "Semantic Filtering by Inference on Domain Knowledge in Spoken Language Dialogue Systems", In Proceeding of theSecond International Conference on Language Resources and Evaluation, May 31, 2000, 6 pages.
Cuayahuitl, et al., "Impact of ASR N-Best Information on Bayesian Dialogue Act Recognition" In Proceeding of the SIGDIAL Conference, Aug. 22, 2013, 5 pages.
Gabsdil, et al., "Combining Acoustic and Pragmatic Features to Predict Recognition Performance in Spoken Dialogue Systems", Proceedings of 42nd Annual Meeting on Association for Computational Linguistics, Jul. 2004, 8 pages.
Jonson Rebecca, "Context-Based Re-ranking and Grounding Classification of N-Best Hypotheses", Published on: Jan. 8, 2007, available at: http://www.ling.gu.se/a/nbestclass.pdf, 11 pages.
Jonson, Rebecca, "Dialogue Context-Based Re-Ranking of ASR Hypotheses", In Proceeding of IEEE Spoken Language Technology Workshop, Dec. 10, 2006, 4 pages.
Jonson, Rebecca, "Information State Based Speech Recognition", In Doctoral thesis, May 2010, 327 pages.
Komatani, School of Informatics, "Generating Effective Confirmation and Guideance Using Two-Level Confidence Measures for Dialogue Systems", Oct. 16, 2000, 4 pages.
Lemon, et al., "Machine Learning for Spoken Dialogue Systems", In Proceeding of European Conference on Speech Communication and Technologies, Aug. 2007, 4 pages.
Lemon, et al., "User Simulations for Context-Sensitive Speech Recognition in Spoken Dialogue Systems", In Proceeding of the 12th Conference of the European Chapter of the ACL, Mar. 3, 2009, 9 pages.
PCT International Search Report in PCT/US2014/066253, dated Apr. 21, 2015, 20 pages.
PCT Written Opinion in PCT/US2014/066253, dated Apr. 12, 2015, 7 pages.
Souvignier, et al., "The Thoughtful Elephant: Strategies for Spoken Dialog Systems", IEEE Transactions on Speech and Audio Processing, IEEE Service Center, New York, NY, US, Jan. 1, 2000, 12 pages.
Wu, et al., "Reducing Recognition Error Rate based on Context Relationships among Dialogue Turns", In Proceeding of 8th Annual Conference of the International Speech Communication Association, Aug. 2007, 4 pages.
U.S. Appl. No. 14/086,897, Office Action dated Mar. 3, 2016, 5 pages.
U.S. Appl. No. 14/086,897, Amendment and Response filed May 3, 2016, 11 pages.
U.S. Appl. No. 14/086,897, Office Action dated Jan. 20, 2017, 7 pages.
PCT 2nd Written Opinion in International Application PCT/US2016/049338, dated Aug. 4, 2017, 11 pages.

(56) References Cited

OTHER PUBLICATIONS

U.S. Appl. No. 14/086,897, Amendment and Response filed Apr. 20, 2017, 13 pages.
U.S. Appl. No. 14/086,897, Office Action dated May 18, 2017, 7 pages.
U.S. Appl. No. 14/086,897, Amendment and Response filed Aug. 17, 2017, 14 pages.
U.S. Appl. No. 14/086,897, Office Action dated Nov. 24, 2017, 7 pages.
"International Preliminary Report on Patentability Issued in PCT Application No. PCT/US2016/049338", dated Dec. 11, 2017, 11 pages.

* cited by examiner

GENERATION AND APPLICATION OF UNIVERSAL HYPOTHESIS RANKING MODEL

BACKGROUND

Hypothesis ranking (HR) is an approach for improving the accuracy of both domain detection and tracking in multi-domain, multi-turn dialogue systems. Language models for HR are typically language/locale dependent where recognition of input depends on a dialogue system being trained to understand a certain language. It is with respect to this general technical environment that the present application is directed.

SUMMARY

Non-limiting examples of the present disclosure describe application of a universal hypothesis ranking model to rank/re-re-rank dialog hypotheses. An input is received through a user interface of an application for dialog processing. A plurality of dialog hypotheses are generated based on input understanding processing of the received input. The plurality of dialog hypotheses are ranked using a universal hypothesis ranking model that is applicable to a plurality of languages and locales. The ranking of the plurality of dialog hypotheses comprises using the universal hypothesis ranking model to analyze language independent features of the plurality of dialog hypotheses for policy determination.

Other non-limiting examples of the present disclosure comprise generation and management of a universal hypothesis ranking model that is applicable to a plurality of languages and locales. A corpus of training data may comprise data for a plurality of different languages, where the corpus of training data comprises data stored and obtained from user input received in a plurality of different languages. The corpus of training data may be analyzed. Based on analyzing the corpus of training data, a language-independent feature set may be created that includes selectable features for ranking of dialog hypotheses. A universal hypothesis ranking model may be generated. The universal hypothesis ranking model is applicable to a plurality of languages and locales. The generated universal hypothesis ranking model may comprise the language-independent feature set that comprises a plurality of features, any of which can be extracted and used as input to a hypothesis ranker (HR) that ranks dialog hypotheses. A ranking of the plurality of dialog hypotheses is output for policy determination, where policy determination may determine one or more ranked dialog hypotheses to output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
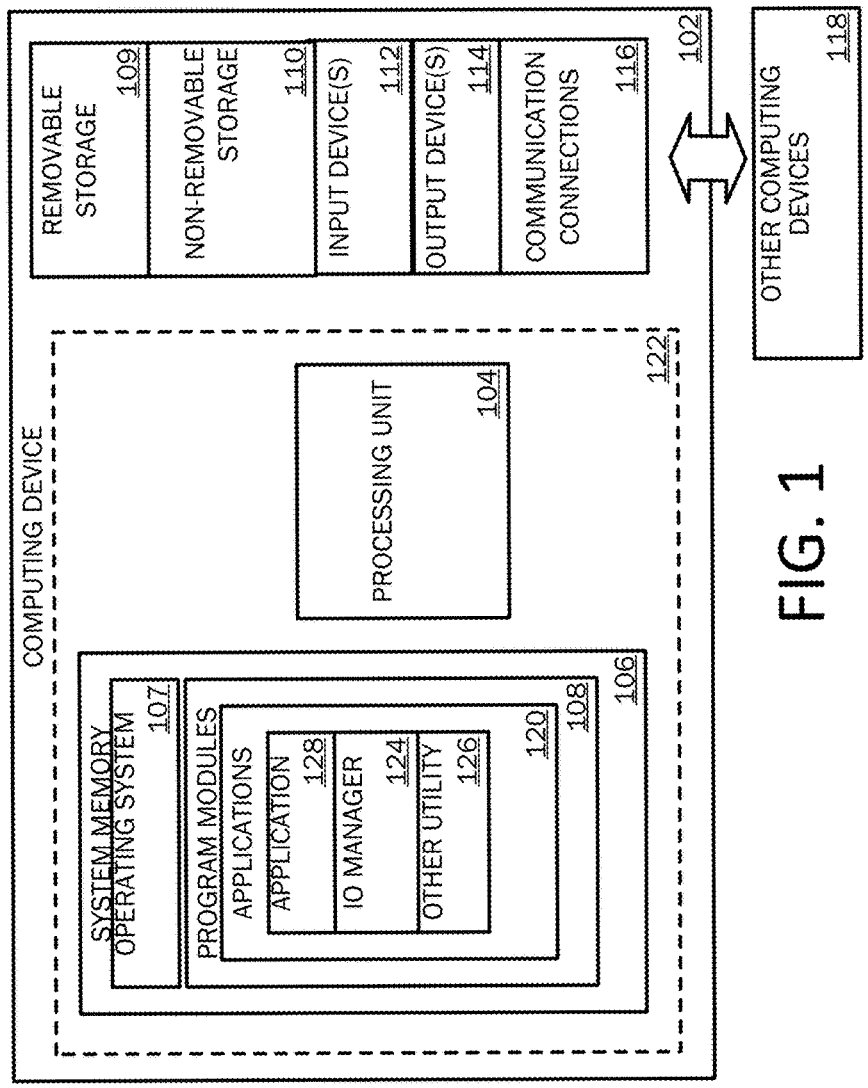
FIG. 1 is a block diagram illustrating an example of a computing device with which aspects of the present disclosure may be practiced.

As natural language interaction, both spoken and typed, becomes mainstream across a range of devices, scaling the same applications and experiences to different locales and languages is critical to input understanding processing. Hypothesis Ranking (HR) improves the accuracy of a common architecture found in commercial multi-domain dialogue systems. Such systems typically first classify the user's utterance with respect to a number of possible domains (e.g., supported or unsupported domain) in language understanding processing, for example by a language understanding component such as a spoken language understanding (SLU) component. A domain refers to a logical grouping with respect to the 'intent' of a received input. For instance, alternatives propagated from input recognition components may be associated with one or more applications/services that can be used to satisfy intent of a received input. Following domain detection, intent of a received input is evaluated by a language understanding component. As an example, a classification associated with intent is domain dependent. For instance, if a domain associated with a received input is a calendar application, a classification of intent may be associated with an action, request, question, etc. that corresponds with the calendar application. For example, an identified intent of a received input may be to schedule a meeting with a contact, where the scheduling occurs within the calendar application. A language understanding component further performs slot tagging. Slot tagging analyzes entity data associated with a received input and corresponds/tags portions of entity data based on predicted domain and intent. An output of a language understanding component (e.g., SLU) is a set of semantic frames (SFs), one per domain, which contains intent and slot information and associated scores. For a semantic frame, relevant knowledge data, e.g. external resource application evaluation, database hits, application of other systems/services, etc., is fetched and appended to a SF. Assemblies of SFs and knowledge data results are referred to as dialog hypotheses. In such a set up the accuracy of domain classification is paramount as any errors made are significantly more noticeable as they tend to result in wildly incorrect system actions or responses.

A dialog system is one or more processing components such as processing devices or software components operating on one or more processing devices to receive and process input in a conversation or dialog exchange. A dialog processing component of a dialog system manages a history and state of a dialog exchange with a user in order to direct a general flow of a conversation or dialog exchange. In doing so, a dialog component analyzes semantic information provided as a result of the input understanding processing described above. HR is a domain ranking/re-ranking mechanism within the dialogue manager stage of a dialogue system, i.e. HR benefits from having the full SLU domain, intent and slot analysis for all domains, as well as full session context and relevant back-end knowledge available to improve domain classification accuracy. Research indicates that input features to HR models may be language independent, for example, derived features in a semantic space, e.g. the existence of a slot tag but not the actual words tagged. Thus, provided the set of domains handled by the dialogue systems are largely the same, an exemplary universal HR model generalizes well across dialogue systems operating in different languages, including previously unseen languages.

Non-limiting examples describe generation and application of a universal hypothesis ranking (HR) model that is applicable to be used with a plurality of languages and locales. In examples, a single ranking model is trained across all language-locale combinations and used in production to accurately rank and evaluate hypotheses generated by a dialog component of a dialog system. A set of extracted input features used by the exemplary universal HR model are largely language independent. Test data shows that the exemplary universal HR model can be used in place of language specific HR models with only a small loss in accuracy, and also such a model generalizes well to new unseen languages, often achieving absolute gains of over 2% in domain accuracy (an average of 60% of the gain that could be achieve by a training a language specific HR model). Test data also shows that optimization of a universal HR model to new languages is achieved without significant retraining, thereby easing expansion of existing dialogue systems to new locales/languages. Furthermore, exemplary universal HR models reduce costs in development and maintenance associated with locale dependent dialog modeling. Thus in some examples, the universal HR model avoids ranking hypotheses based on lexical features from a user's utterance in order to avoid the ranking model from re-computing a lower level lexical analysis already undertaken by a language understanding component of an SLU but also with an eye towards portability between different languages/dialogue systems.

Accordingly, the present disclosure provides a plurality of technical effects including but not limited to: enhanced semantic processing of input and dialog exchange in a multi-turn dialog system, improved processing and accuracy in ranking of hypotheses as output, scalability and applicability of a universal HR model that is implementable across a plurality of platforms, universal HR model that can manage dialog exchanges/conversational flow for a wide variety of languages/locales including low-resourced languages, reduction of processing load for dialog systems/services including a reduction in maintenance overhead for language model processing as compared with use of multiple language/locale specific language models, and control over user interaction for dialog processing, among other examples.

Figure 2A:
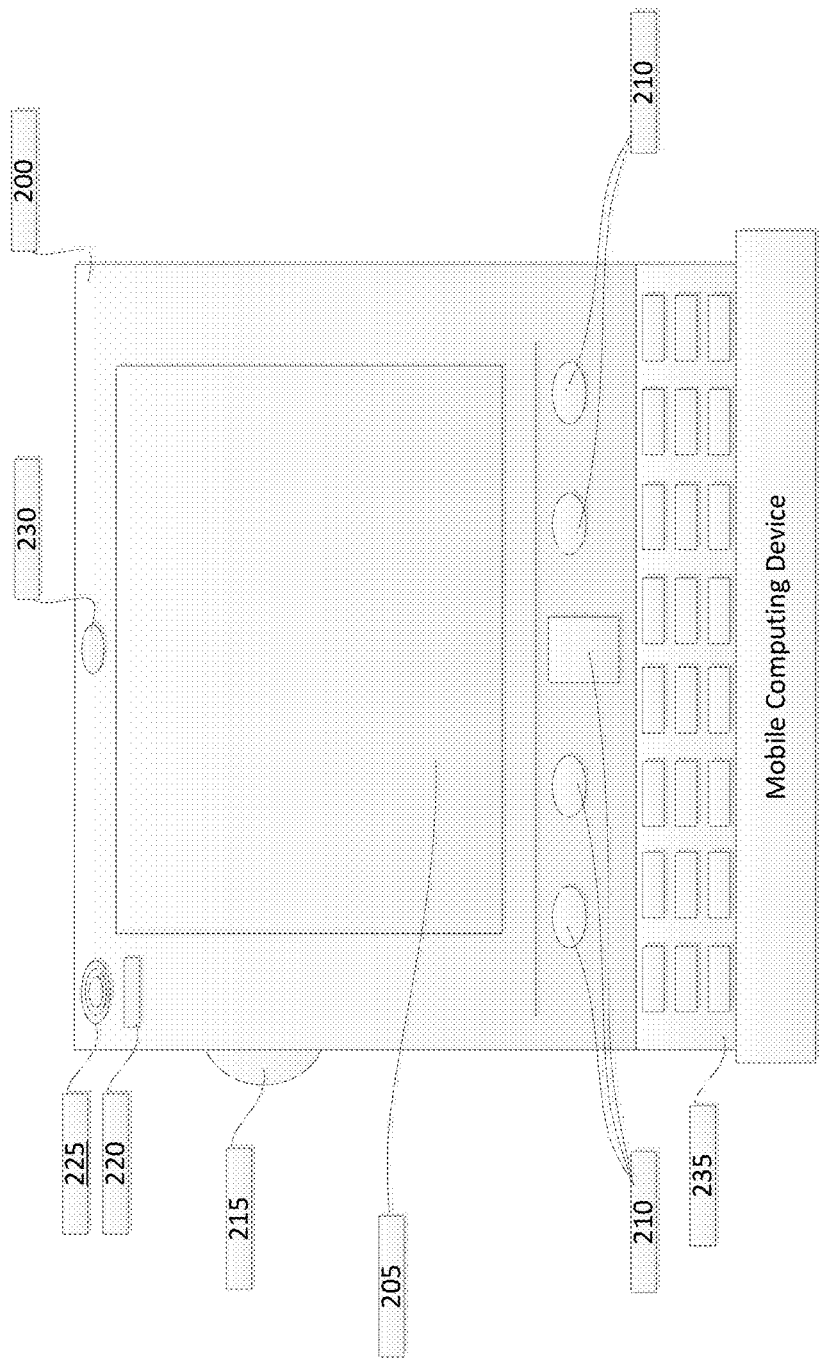
FIGS. 2A and 2B are simplified block diagrams of a mobile computing device with which aspects of the present disclosure may be practiced.
Figure 2B:
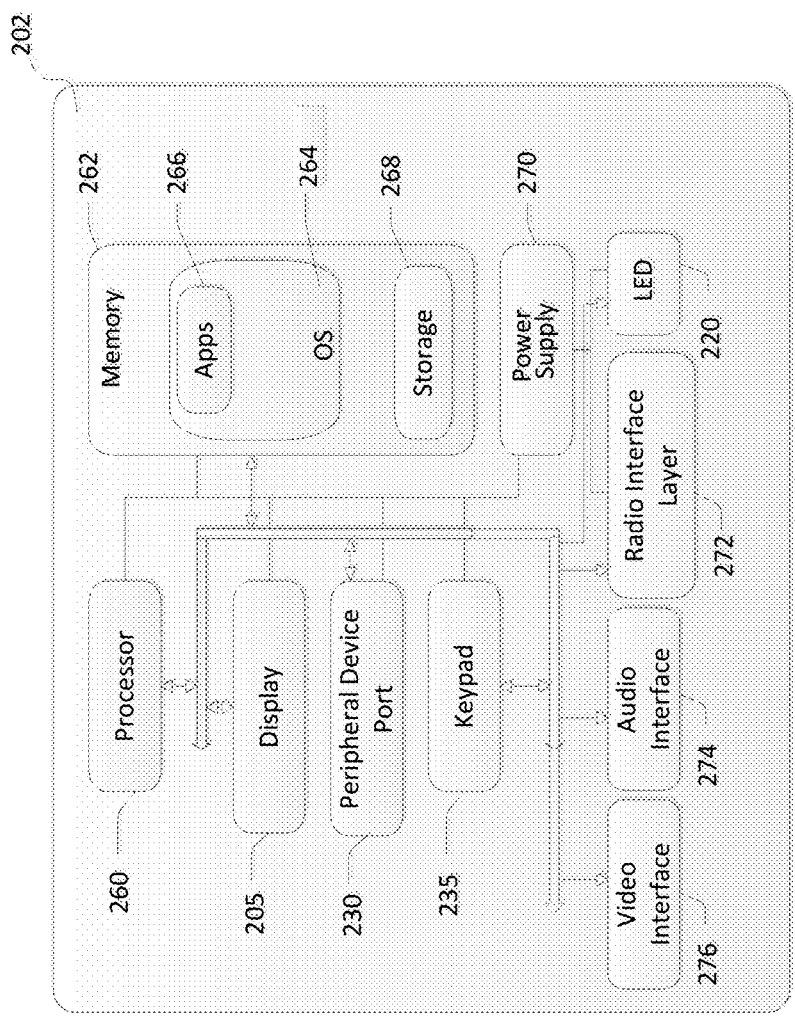
Figure 3:
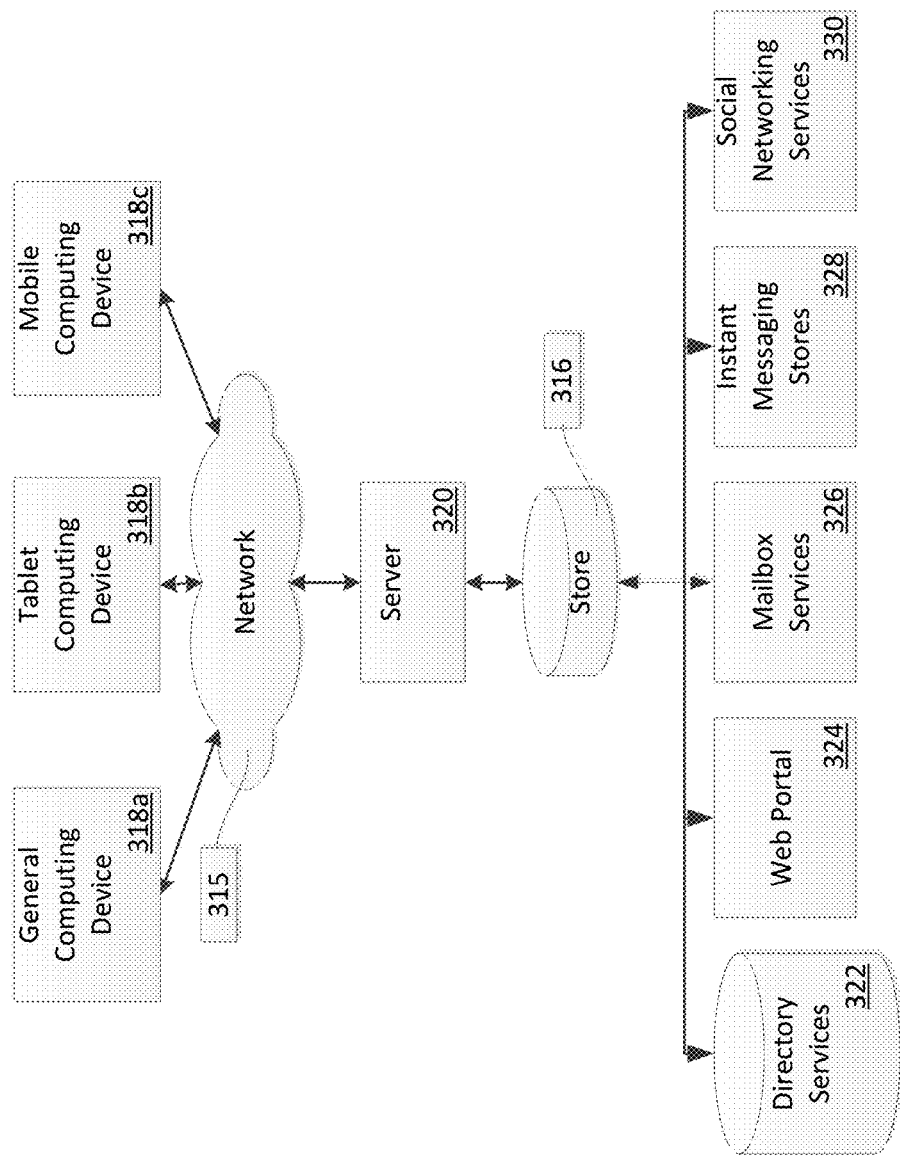
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices.

Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
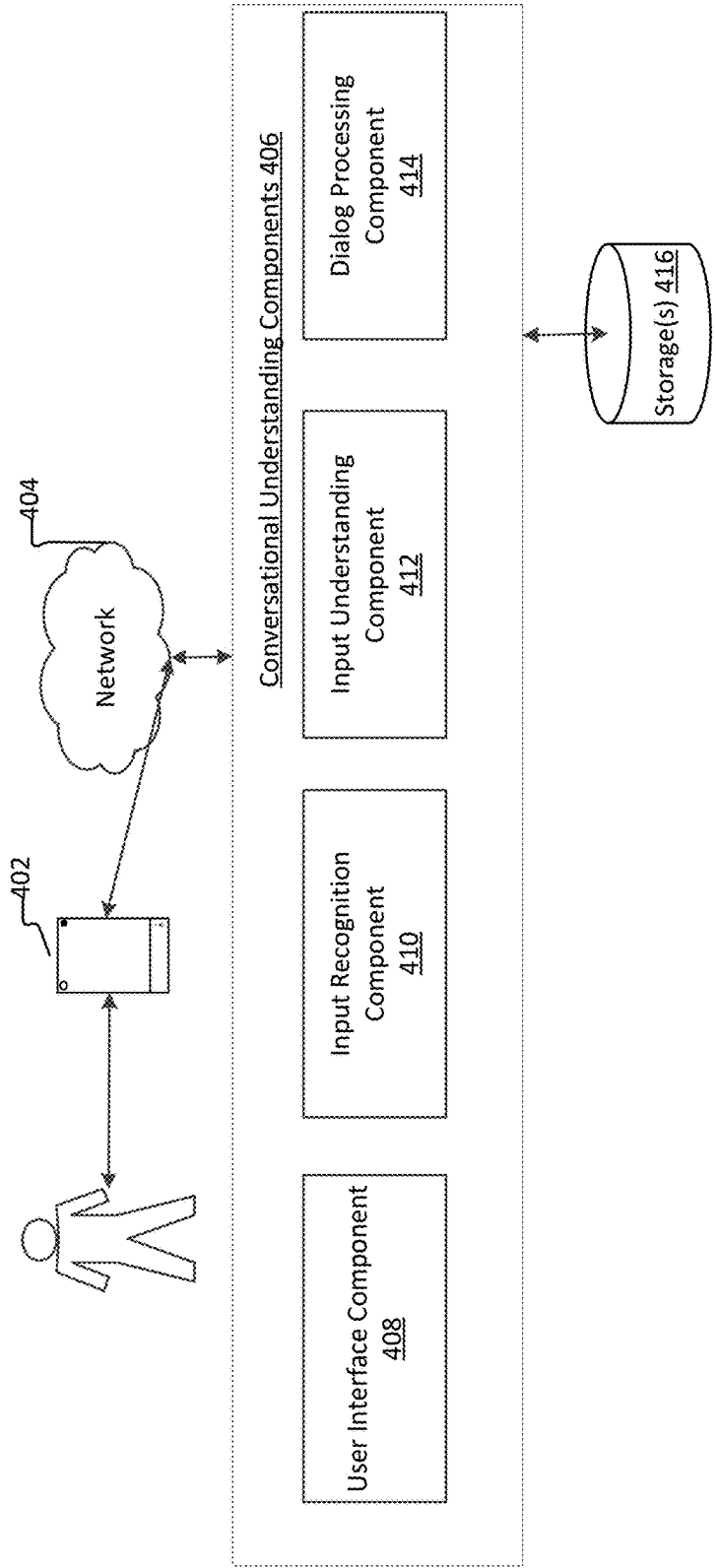
FIG. 4 illustrates an exemplary system implementable on one or more computing devices on which aspects of the present disclosure may be practiced.

FIG. 4 illustrates an exemplary system 400 implementable on one or more computing devices, according to examples described herein. Exemplary system 400 presented is a combination of interdependent components that interact to form an integrated whole for learned program generation based on user example operations. Components of system 400 may be hardware components or software implemented on and/or executed by hardware components of system 400. In examples, system 400 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 400 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device to allow input understanding and processing for dialog flow/conversation management. For example, the system 400 may be configured to receive input from a user and process the received input to manage user interaction. Aspects related to enabling entry of input and receiving the input for processing are well known in the field of use and are not described in the present disclosure. In one example, system 400 may be an input understanding system such as a conversational understanding (CU) system or dialog system. However, the system 400 possesses processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces, etc.), vehicular processing devices, and any other devices having at least one processor, among other examples. In one example, the system 400 may operate as an intelligent personal assistant. An intelligent personal assistant is a mobile software agent that can perform tasks, or services, for an individual based on user input, location awareness, and the ability to access information from a variety of online sources. Examples of intelligent personal assistants that the system 400 may operate with include but are not limited to SILVIA, S-Voice, Voice Mate, Google Now, Cortana, Hidi and Siri, among other examples. However, one skilled in the art will recognize that input understanding processing examples are not limited to application in an intelligent personal assistant. Exemplary system 400 comprises conversational understanding components 406 including a user interface component 408, an input recognition component 410, an input understanding component 412, a dialog processing component 414, where each of the identified components may comprise one or more additional components as shown in FIG. 4.

System 400 may further comprises one or more storages 416 that may store data associated with operation of one or more components of system 400. Storages 416 are any physical or virtual memory space. Storages 416 may store any data for processing operations performed by components of system 400, retained data from multi-turn dialog processing for an interaction with a user, modeling data for execution of processing operations, and knowledge data among other examples. Furthermore, in examples, components of system 400 may utilize knowledge data in processing by components of system 400. Knowledge data is any data that is usable by a component of system 400 to improve processing of any of the conversational understanding components 406 where knowledge data can be obtained from resources internal or external to system 400. In examples, knowledge data may be maintained in storage(s) 416 or retrieved from one or more resources external to system 400 by knowledge fetch operation. External resources are any resource (e.g., system, application/service, etc.) that exists and is manageable outside of system 400. External resources include but are not limited to systems, application/services that may be managed by a same organization as system 400 (e.g., other services provided by an organization such as web search services, e-mail applications, calendars, device management services, address book services, informational services, etc.) as well as services and/or websites that are hosted or controlled by third parties. For example, external resources may include line-of-business (LOB) management services, customer relationship management (CRM) services, debugging services, accounting services, payroll services, etc. External resources may further include other websites and/or applications hosted by third parties, such as social media websites; photo sharing websites; video and music streaming websites; search engine websites; sports, news or entertainment websites, and the like. External resources may provide robust reporting, analytics, data compilation and/or storage service, etc., whereas other external resources may provide search engines or other access to data and information, images, videos, and the like.

Processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more circuits. In one example processing device 402 may be a device of a user that is running an application/service that may interact with a user through a dialog exchange. In examples, processing device 402 may communicate with conversational understanding components 406 via a network 404. In one aspect, network 404 is a distributed computing network, such as the Internet.

The conversational understanding components 406 are a collection of components that are used for managing interaction between a user and a processing device or application executing on a processing device. Conversational understanding components 406 comprise a user interface component 408 an input recognition component 410, an input understanding component 412, a dialog processing component 414. In examples, conversational understanding components 406 may be stored and access to one or more of the conversational understanding components 406 may be distributed, for example through a distributed network. In alternative examples, conversational understanding components 406 may be associated with an application that is stored and executable on processing device 402.

The user interface component 408 is one or more components that are configured to enable interaction with a user of an application or service associated with an application or service. Transparency and organization are brought to users of such an application/service through the user interface component 408 where a user can interact with an application through user interface elements. As an example, the user interface component 408 may comprise generation and display of one or more user interface elements upon a display of a processing device. As a further example the user interface component 408 may generate natural language responses that are spoken back to the user using a text to speech (TTS) component. This may be in conjunction with displaying user interface elements or without such elements, e.g. in a hand-free eyes-free mode of operation, or on a form factor with no display. For example, in response to a user action to enter input into the device, the user interface component 408 may receive and process the request and initiate action to display a prompt for entering input into an application/service associated with a processing device upon which the application/service is executing. The user interface component 408 may further execute as a front-end for display of back-end processing performed by the other conversational understanding components 406 such as the input recognition component 410, the input understanding component 412 and the dialog processing component 414. In examples, user interface definition files may comprise programming instructions or operations for management and display of user interface elements associated with user interface component 408.

Input recognition component 410 is a component of the system 400 that receives, processes and translates a received input for recognition. The exemplar input recognition component 412 is a multi-turn, multi-domain statistical model that consists of one or more models for input recognition. When an input is received, for example via the user interface component 408, the input is transmitted to the input recognition component 410 for processing. As examples described above, inputs processed by the input recognition component 410 include but are not limited to speech/voice input (e.g., utterances), text input, gesture input and handwritten input, among other examples.

The input recognition component 410 is configured to process the received input into a form that is able to be understood by components of system 400. As an example, the input recognition component 410 may process a spoken utterance into text. In examples, input recognition component 410 may implement automatic speech recognition (ASR), computer speech recognition, or speech to text (STT), among other examples, to process speech to text for evaluation/additional processing by system 400. The input recognition component 410 is configurable to generate a set of potential alternatives for recognizing the received input. An alternative is a result generated by a processing component of system 400 that is produced based on processing by one or more components of system 400. In examples, alternatives produced are an interpretation of how the input is understood by system 400. For instance, a speech input or utterance may be received and evaluated to generate alternatives such as "I'm Home" and "Drive Home." That is, in processing the received utterance, the input recognition component 410 may generate a set of alternatives related to what the system 400 understood from the received utterance. NBest list of alternatives may be generated for the received input and propagated for further processing, for example, to the input understanding component 412. In examples, the input recognition component 410 may process the received input by producing a word confusion network (WCN) and/or lattice which can then be used to generate top and subsequent alternatives for the received input.

In some examples, the input recognition component 410 may comprise a ranker component that can be used to evaluate the alternatives generated by the input recognition component 410. In one example, generated alternatives may be ranked based on a determined likelihood that an alternative satisfies an intention of a received input. However, a component may analyze and evaluate alternative in any manner that enables the component to distinguish alternatives from one another. In examples, a confidence value may be associated with each of the generated alternatives. For instance, in the example above where a received utterance is interpreted as "I'm Home" and another as "Drive Home", a confidence value may be assessed to each of the potential alternatives, where the confidence value indicates how confident the input recognition component 410 is with respect to interpreting the received utterance. Comparison of alternatives may include statistical modeling and/or ranking of alternatives whereby metrics may be applied to rank the generated alternatives. In one example, machine learning processing is applied to rank alternatives or alternates generated by the input recognition component 410.

Input understanding component 412 analyzes context associated with a propagated alternative (received from the input recognition component 410) to perform input understanding processing for the propagated alternatives. The input understanding component 412 is a multi-turn, multi-domain statistical model that consists of a set of domain, intent and slot models. As an example, input understanding component 412 may be natural language understanding (NLU) components or a spoken language understanding (SLU) components. However, one skilled in the art will recognize that operations of the input understanding component 412 are not limited to NLUs and SLUs. For each domain the input understanding component 412 generates a domain score, for example, using support vector machine (SVM) models. These domain models use the system's previous turn's selected domain as a contextual input signal which improves domain prediction accuracy. After domain classification, intents are then determined, for example, using a multi-class SVM intent model. Furthermore, entities (slots) are tagged using conditional random fields (CRFs) sequence taggers, among other examples. The output of the input understanding component 412 is a set of semantic frames (SFs), one per domain, which contain intent and slot information, and associated scores. In examples, knowledge data (e.g., stored in storage 416) may be accessed and used to assist the input understanding component 412 in scoring. In assigning a score to an SF, the input understanding component 412 may use one or more rankers. Scoring associated with generated results of an input understanding component 412 is known in the field of art.

A dialog processing component 414 is one or more components that manages a history and state of a dialog exchange with a user in order to direct a general flow of a conversation or dialog exchange. In doing so, the dialog processing component 414 analyzes semantic information provided as a result of the input understanding processing described above. In examples, the dialog processing component 414 employs one or more models (e.g., statistical or machine learning models) to execute operations. For instance, the dialog processing component 414 may be configured to perform operations related to a knowledge fetch for data associated with an SF, generation of dialog hypotheses, application of a universal language model for hypothesis ranking (HR), policy determination for output of a response to a received input, and management of a state of an interaction with a user in a multi-turn dialog exchange or conversation, among other operations. The dialog processing component 414 may perform further processing on SFs generated by the input understanding component 412 including generation of dialog hypotheses and HR ranking of the generated dialog hypotheses. Assemblies of SFs and knowledge data results are referred to as dialog hypotheses. HR is a domain ranking/re-ranking mechanism within the dialogue manager stage of a dialogue system, i.e. HR benefits from having the full SLU domain, intent and slot analysis for all domains, as well as full session context and relevant back-end knowledge available to improve domain classification accuracy. Further details regarding operations performed by the dialog processing component 414 are described in detail in the description of FIG. 5.

Figure 5:
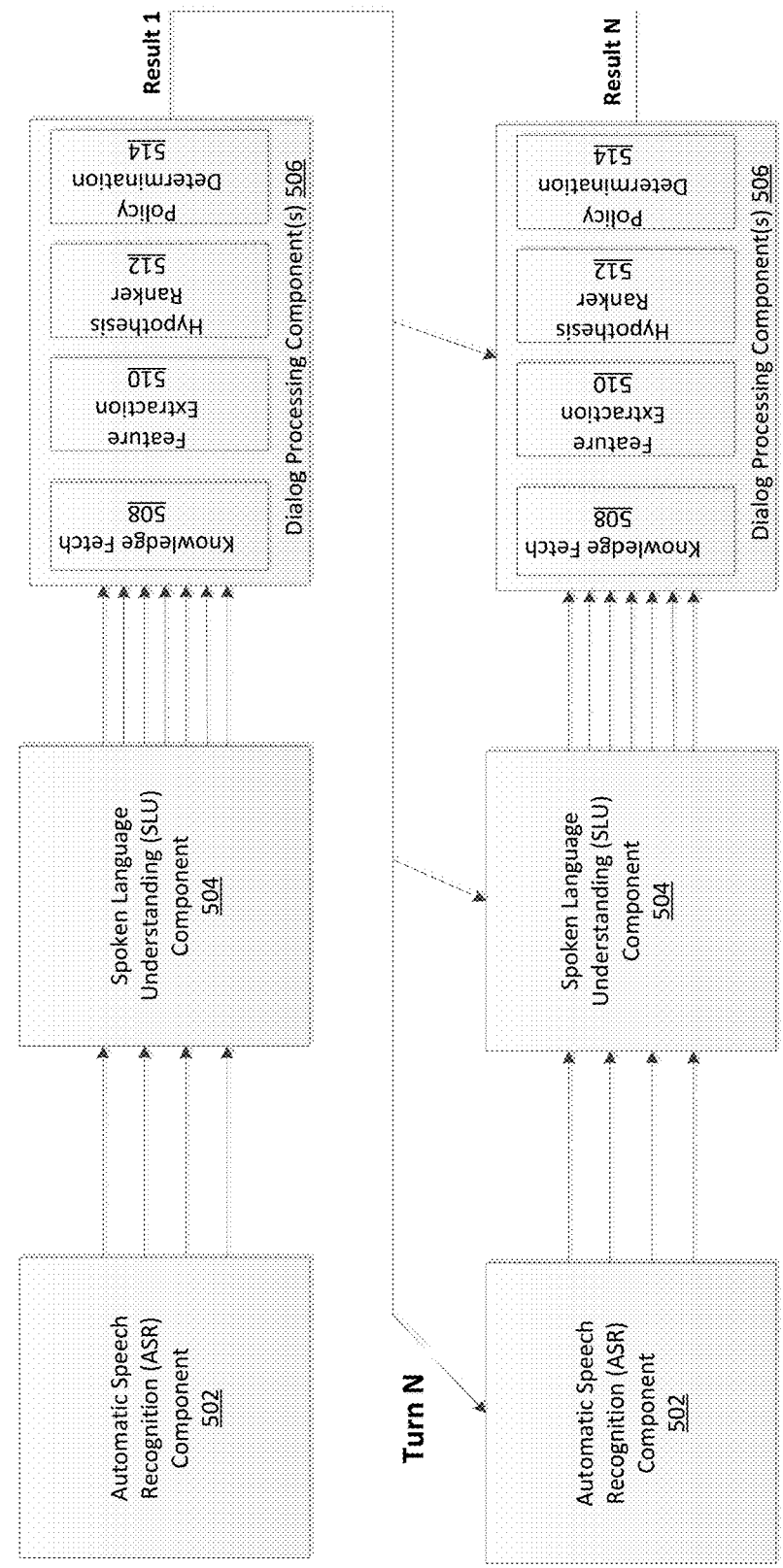
FIG. 5 is an exemplary system for dialog processing with which aspects of the present disclosure may be practiced.

FIG. 5 is an exemplary system 500 for dialog processing with which aspects of the present disclosure may be practiced. Exemplary system 500 presented is a combination of interdependent components that interact to form an integrated whole for learned program generation based on user example operations. Components of system 500 may be hardware components or software implemented on and/or executed by hardware components of system 500. In examples, system 500 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 500 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 500 may vary and may include more or fewer components than those described in FIG. 5. In some examples, interfacing between components of the system 500 may occur remotely, for example where components of system 500 may be spread across one or more devices of a distributed network. In examples, one or more data stores/storages or other memory are associated with system 500. For example, a component of system 500 may have one or more data storages/memories/stores associated therewith. Data associated with a component of system 500 may be stored thereon as well as processing operations/instructions executed by a component of system 400. Components of the system 500 may interface with an OS of a processing device to allow input understanding and processing for dialog flow/conversation management. For example, the system 500 may be configured to receive input from a user and process the received input to manage user interaction. Aspects related to enabling entry of input and receiving the input for processing are well known in the field of use and are not described in the present disclosure. In one example, system 500 may be an input understanding system such as a conversational understanding (CU) system or dialog system. Components of system 500 may comprise an automatic speech recognition (ASR) component 502, a spoken language understanding component 504 and dialog processing components 506. As an example, components of system 500 are exemplary conversational understanding components 406 as described in system 400 of FIG. 4. The description of FIG. 5 further provides description of operational components of the dialog processing components 506. Dialog processing components 506 may comprise a knowledge fetch component 508, a feature extraction component 510, a hypothesis ranker (HR) component 512, and a policy determination component 514.

The ASR component 502 is an example of an input recognition component 410 described in the description of FIG. 4. As an example, the ASR component 502 translates a received input that is a spoken utterance into text for system 500 to understand and process. The ASR applies modeling (e.g., acoustic modeling and language modeling) for recognition of not only the lexical aspects of a received spoken utterance but also speaker identification. In examples, the ASR component 502 may use models including but not limited to: Hidden Markov models (HMMs), document classification, statistical machine translation, and machine-learning processing, among other examples.

The SLU component 504 is an example of an input understanding component 412 described in the description of FIG. 4. Refer to the description of the input understanding component 412 for further details regarding processing operations performed by SLU component 504. As an example, the SLU component 504 performs statistical modeling comprising a set of domain, intent and slot models to be able to develop multi-human/machine conversations. In analyzing each of domain, intent and slot (e.g. slot tagging of entity data), SVM models may be used. However, one skilled in the art should recognize that other types of modeling may be implemented in SLU processing as known in the field of art. An output of the SLU component 504 is a set of semantic frames (SFs), one per determined domain which contains intent and slot information and associated scoring/ranking data. The SFs are propagated to the dialog processing components 506 for further processing.

The dialog processing components 506 are a collection of components that manage a history and state of a dialog exchange with a user in order to direct a general flow of a conversation or dialog exchange. In doing so, the dialog processing component 506 analyze semantic information, such as SFs, generated by SLU processing. In examples, the dialog processing component 506 employs one or more models (e.g., statistical or machine learning models) to execute operations. Dialog processing components 506 is an example of dialog processing component 414 described in the description of FIG. 4. Dialog processing components 506 may comprise a knowledge fetch component 508, a feature extraction component 510, a hypothesis ranker (HR) component 512, and a policy determination component 514.

The knowledge fetch component 508 performs processing operations that evaluate and analyze SF data to generate one or more dialog hypotheses from each of the SFs. In doing so, the knowledge fetch component 508, may fetch relevant knowledge data from resources (e.g., internal or external to system 500) and append the fetched knowledge data to the SF to generate a dialog hypothesis. An internal resource comprises knowledge data internal to system 500 and may include log data collected from users of one or more dialog system and/or conversational understanding application, as well as other manually engineered data or crowd sourced data. External resources are any resource (e.g., system, application/service, etc.) that exists and is manageable outside of system 400. External resources include but are not limited to systems, application/services that may be managed by a same organization as system 500 (e.g., other services provided by an organization such as web search services, e-mail applications, calendars, device management services, address book services, informational services, etc.) as well as services and/or websites that are hosted or controlled by third parties. For example, external resources may include line-of-business (LOB) management services, customer relationship management (CRM) services, debugging services, accounting services, payroll services, etc. External resources may further include other websites and/or applications hosted by third parties, such as social media websites; photo sharing websites; video and music streaming websites; search engine websites; sports, news or entertainment websites, and the like. External resources may provide robust reporting, analytics, data compilation and/or storage service, etc., whereas other external resources may provide search engines or other access to data and information, images, videos, and the like. As an example of knowledge fetch processing, name data/contacts may be checked in an address book application or list of contacts of the user who made the utterance. Other resources such as web searches/search results may be provided and used to evaluate content/data of a dialog hypothesis such as entity data. The knowledge fetch component 508 may propagate the generated dialog hypotheses to the feature extraction component 510 for further processing.

The feature extraction component 510 is a processing component that performs operations to extract features from the generated dialog hypotheses. The extracted features may be used by the hypothesis ranker (HR) component 512 of the dialog processing components 506 to rank/re-rank (or score/rescore) the generated dialog hypotheses. In examples, any of over 1,000 features may be extracted for each dialog hypothesis. These features comprise but are not limited to: binary features that indicate the presence or absence of a particular entity tag in that domain's analysis of the user's utterance, the domain's interpretation of the intent, the presence of canonicalized entities (not all tagged entities may have a canonical form), coverage of tagged entities (as percentage of the utterance length), etc. Other extracted features span the set hypotheses that are ranked together, e.g. whether a specific entity tag occurs anywhere in any of the hypotheses. Other features are contextual features such as whether the hypothesis's domain matches the top ranked domain from the previous turn, how many entity tags a hypothesis has in common with the previous top ranked hypothesis, as well as the complete list of previous turn's domains' scores. Features extracted from back-end domain knowledge include whether or not results can be generated for that hypothesis's combination of domain, intent and tagged entities, etc. In some examples, extracted features may not directly contain word or phrases from the user's utterance, e.g. no n-grams features or lexical features. In such examples, avoiding using lexical features provides benefits of avoiding an HR ranking model from re-computing the lower level lexical analysis already undertake by the SLU as well as providing portability between languages, among other examples. Although some features are possibly influenced by the language in which the dialogue system is operating, for example the coverage of tagged entities as a percentage of the utterance length, the features can be computed in all languages. In addition the features extracted may not directly indicate the language or locale of the dialogue system in which the HR model is deployed. Thus, feature extraction and ultimately HR processing can be applied to a plurality of languages including unforeseen or low-resource languages. In this way, exemplary conversational systems or dialog systems are able to process any type of input data and are scalable and expandable. In examples, machine-learning processing or other types of statistical modeling may be employed to extract features for ranking of dialog hypotheses.

Extracted features are propagated to the HR component 512 for ranking/re-ranking of the dialog hypotheses based on evaluation of the extracted features of a plurality of dialog hypotheses. To rank dialog hypotheses, the HR component 512 employs a universal hypothesis ranking model that is applicable to a plurality of languages and locales. In an example, the universal hypothesis ranking model is shareable between dialog systems operating in different languages and may be used to process dialog exchanges even in low-resource languages (e.g., minority languages or newly developing regional markets for which limited language data has been collected). The HR component 512 ranks data of an SF, such as domains recognized by the SLU component 504, based on a complete view of SLU processing, knowledge fetch results obtained by the knowledge fetch component 508, and conversational context (e.g., turn processing during conversation/dialog exchange such as turn 1, turn 2, turn N, etc.). The universal language model is trained based on a corpus of training data to enable the HR component 512 to be adaptable to work with different languages and locales. Description relates to training data and generation of an exemplary universal hypothesis ranking model is provided below in the description of FIG. 7.

As an example, HR models may comprise Gradient Boosted Decision Tree (GBDT) models. Within a specific dialogue system an HR model assigns scores to each dialogue hypothesis, where the scores of dialog hypotheses are then used to rank/order the dialog hypotheses. In examples, the HR model score may be optimized using machine-learning processing or statistical ranking models (e.g., LambdaRank) based on the extracted features. For training, each dialogue hypothesis may be assigned a score/rating of 1 if its domain matches that selected by an annotator otherwise the score/rating may be less than 1. However, one skilled in the art should recognize that scoring associated with ranking of dialog hypotheses is customizable and may vary, e.g., a multi-point scale where 5 is 'perfect' (correct domain, intent and all slots), 4 is 'good' (correct domain, intent and some slots), 3 is 'ok' (correct domain, and intent), all the way down to 0 which is 'terrible' (incorrect domain, intent and slots).

Ranked dialog hypotheses from HR processing by the HR component may be propagated to the policy determination component 514. The policy determination component 514 performs processing operations related to evaluation of the ranked dialog hypotheses and output of a result. A result may comprise a response or action chosen (e.g., "Result 1" shown in FIG. 5), which may be transmitted back to a processing device of a user who initiated an input/utterance. A response or action may comprise one or more dialog hypotheses as well as other data that may be useful in managing a conversation with users. For instance, the policy determination component may output a dialog hypothesis to the user, may present multiple dialog hypotheses for the user to choose from, may request that the user disambiguate between dialog hypotheses, may ask for more information, etc. In other cases, system 500 may take action by launching an application or processing a user request based on evaluation of ranking results of the dialog hypotheses. In doing so, the policy determination component 514 may reference a policy that provides instructions or rules for managing a conversation with a user. In doing so, the policy determination component 514 may employ statistical models or machine-learning operations to output a result for dialog processing.

FIG. 5 further illustrates that a dialog may continue between system 500 and a user. For example, after a result (e.g., "result 1") is transmitted to a user, further input may be received by system 500. System 500 may manage a state of a conversation/dialog exchange with a user so that results from previous turns may be useful in continued conversation with a user. In some examples, result data from processing of any component of system 500 may exist from any previous interaction with system 500. In examples, log data may be maintained and managed by system 500 to intelligent processing based on previous turns from a specific user or one or more other users. As an example, machine-learning operations may be applied to manage a state of a conversation based on a received input. In one example, a subsequent turn of processing by system 500 (e.g., "turn 2") repeats processing steps described above except in such a case, each component of system 500 is aware of previous results (e.g., result 1 or other result data maintained by system 500 from one or more users). For instance, result 1 may influence the analysis/processing performed by processing models of the components of system 500. In examples, processing of a subsequent received input may comprise processing performed by one or more of the ASR component 502, the SLU component 504, and the dialog processing components 506 comprising the knowledge fetch component 508, the feature extraction component 510, the HR component 512, and the policy determination component 514. As an example, HR component 512 may use features extracted from Result 1 as part of an input when considering Turn N's list of alternative dialog hypotheses. For each subsequent received input (e.g., N inputs), system 500 may generate a result (e.g., Result N).

Figure 6:
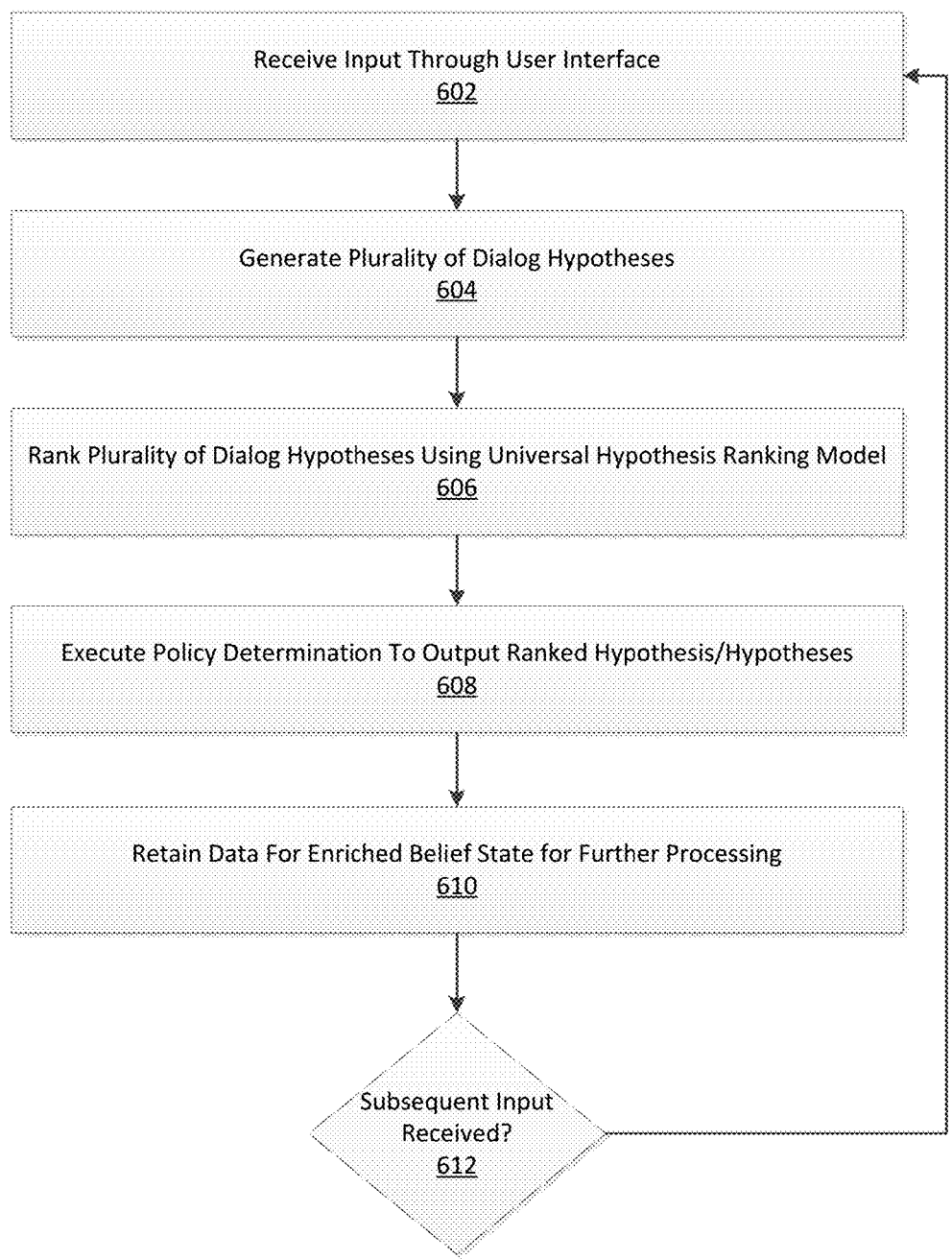
FIG. 6 is an exemplary method for input processing with which aspects of the present disclosure may be practiced.

FIG. 6 is an exemplary method 600 for input processing with which aspects of the present disclosure may be practiced. As an example, method 600 may be executed by an exemplary system such as shown in FIGS. 1-5. In examples, method 600 may be executed on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g. cloud service). In examples, operations performed in method 600 may correspond to operations executed by a system and/or service that execute computer programs, application programming interfaces (APIs), or machine-learning processing, among other examples.

Method 600 begins at operation 602, where an input is received through a user interface (UI) of an application for dialog processing. In examples, input may be received and processing by an input recognition component such as the input recognition component 408 of FIG. 4 and an exemplary ASR component 502 as described in the description of FIG. 5. In examples, operation 602 performs operations for input recognition and may propagate result data (e.g., generated alternatives) to an input understanding component for further processing.

Flow proceeds to operation 604 where operations are performed for generating a plurality of dialog hypotheses based on input understanding processing of the received input. Input understanding component may be input understanding component 412 of FIG. 4 and an exemplary SLU component 504 as described in the description of FIG. 5. As an example, operation 604 may generate SF data for each of a plurality of possible alternatives for consideration in response to a received input. The generated SF data may be propagated to a dialog processing component (e.g., knowledge fetch component 508 described in FIG. 5) to execute a knowledge fetch to analyze semantic frame data generated by language understanding processing. The executed knowledge fetch applies using knowledge data obtained from at least one database. Dialog hypotheses may be generated based on evaluation of the SF data and application of knowledge data from a knowledge fetch operation. The generated dialog hypotheses may be further propagated to additional dialog processing components for further processing.

Flow proceeds to operation 606 where operations are performed for ranking the plurality of dialog hypotheses using a universal hypothesis ranking model. Exemplary universal hypothesis ranking models that may be applied are described above where the universal hypothesis ranking model is applicable to a plurality of languages and locales. Operation 606 may further comprise one or more operations of a dialog processing component 506 as described in the description of FIG. 5, for example. Ranking (operation 606) may comprise using the universal hypothesis ranking model to analyze language independent features of the plurality of dialog hypotheses for policy determination. The ranking (operation 606) may further comprise extracting a plurality of language independent features for each of the plurality of dialog hypotheses, and scoring the plurality of dialog hypotheses based on analyzing the extracted features using training data of the universal hypothesis ranking model. Exemplary training data comprises data for a plurality of different languages. Ranked dialog hypotheses may be propagated to a policy determination component such as the policy determination component 514 described in the description of FIG. 5.

In operation 608, a policy determination is executed on the ranked dialog hypotheses that outputs one or more of the ranked plurality of dialog hypotheses. In examples, operation 608 may output a result to a user of a system/application/service.

In examples, method 600 may comprise operation 610 where data may be retained (e.g., stored) and used to manage a state of conversational flow between a system/application/service and a user.

Flow may proceed to decision operation 612 where it is determined whether a subsequent input is received. If not, flow a system or service associated with method 600 may remain idle until further input is received. If subsequent input is received, flow branches YES and processing of method 600 returns to operation 602. In processing of the subsequent input, an exemplary system or service may utilize the retained data to enhance processing of the subsequent input during at least one selected from group consisting of input recognition processing, input understanding processing and dialog processing.

Figure 7:
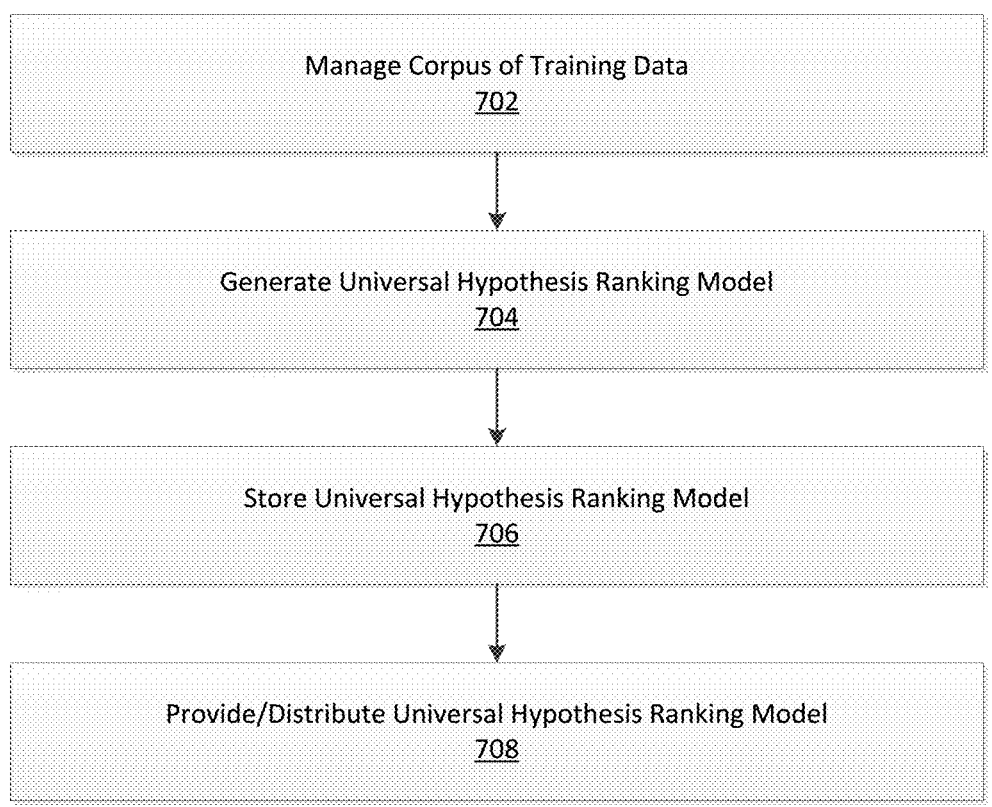
FIG. 7 is an exemplary method for generation of a universal hypothesis ranking model with which aspects of the present disclosure may be practiced.

FIG. 7 is an exemplary method 700 for generation of a universal hypothesis ranking model with which aspects of the present disclosure may be practiced. As an example, method 700 may be executed by an exemplary system such as shown in FIGS. 1-5. In examples, method 700 may be executed on a device comprising at least one processor configured to store and execute operations, programs or instructions. However, method 700 is not limited to such examples. In at least one example, method 700 may be executed (e.g., computer-implemented operations) by one or more components of a distributed network, for instance, web service/distributed network service (e.g. cloud service). In examples, operations performed in method 700 may correspond to operations executed by a system and/or service that execute computer programs, application programming interfaces (APIs), or machine-learning processing, among other examples.

Flow begins at decision operation 702, where a corpus of training data for a universal hypothesis ranking model is managed. Exemplary universal hypothesis ranking models are previously described in detail where the universal hypothesis ranking model is applicable to a plurality of languages and locales. Operation 702 may comprise analyzing the corpus of training data, wherein the corpus of training data comprises data that may be obtained from user input received in a plurality of different languages. In examples, the corpus of training data is a collection of stored data that can be accessed and continuously updated, for training purposes. The corpus or corpora used for training and testing may comprise logs of received input (including spoken utterances or typed input) collected from real users. Such training data may further comprise a mix of manually engineered or crowd sourced data. One skilled in the art should recognize that additional data or information may be collected and analyzed to include in the corpus of training data. The log data may be segmented into sessions based on annotator judgement, predetermined determined signals, e.g., launching an application or when users closed an application such as a personal data assistant, segmented using machine learning classification models, etc. In examples, exemplary log data may comprise data from a plurality of languages. For instance, roughly equal amounts of training data may be collected for a plurality of languages-locales. The corpora for the languages/locales may span similar domains with multiple intents per domain to analyze and evaluate. In examples, the corpus of training data may be run through a variety of language dialogue systems (e.g., each for a different language) until feature extraction processing. Features may then be collected and stored from the set of hypothesis generated. For instance, data for the plurality of different languages may be obtained from two or more language-specific dialog application components stored in a memory of one or more processing devices. For second and subsequent turns within a session, in the absence of an existing HR model, contextual signal may be taken as being the domain, intent and entities contained in the previous turn hypothesis that has the highest SLU domain score. These signals are used as part of the captured hypothesis feature set. This may be a-work-around to the bootstrapping issue that a HR model may, when in operation, effect the previous turn domain selection that it sees on subsequent turns. This may results in a set of training examples with input features required by the HR models which are associated human annotated domain labels as supervisory signals. In examples, a separate training corpus may be collected for each locale and processed in the same way. The collected and featurized data is used as an off-line training and test set for HR model training and testing.

Flow may proceed to operation 704 where an exemplary universal hypothesis ranking model is generated. As identified above, the universal ranking model applicable to a plurality of languages and locales including low-resource languages or new upcoming regional market languages. For instance, processing operations associated with one or more universal hypothesis ranking models may be adaptable to evaluate input received in an unknown language or locale. Operation 704 may comprise creating, based on the analyzed corpus of training data, a language-independent feature set that includes selectable features for ranking of dialog hypotheses. As described in FIGS. 4-6, features may be extracted for a generated dialog hypothesis to evaluate and rank a dialog hypothesis in comparison with other dialog hypotheses. As an example, features may be selected from the featurized data of the corpus of training data to be applied to dialog hypotheses. In examples of applying the universal hypothesis ranking model, operations may comprise extracting a selectable feature set comprising two or more features from a language-independent feature set of the training data, and analyze a dialog hypothesis of the plurality of dialog hypotheses using the extracted selectable feature set.

Once a universal hypothesis ranking model is generated, flow may proceed to operation 706 where the generated universal hypothesis ranking model is stored. As an example, the generated hypothesis ranking model may be stored in a memory of a processing device (e.g., server device) for access in a distributed network. In other examples, the generated hypothesis ranking language model may be incorporated into a dialog processing or conversational understanding applications or services that are distributable to operate on a plurality of different processing devices. In some examples, different versions of the universal language model may be generated for form-factor application.

Flow may proceed to operation 708 where access to the universal hypothesis ranking model may be provided or the universal hypothesis ranking model may be distributed within a one or more of the above discussed dialog processing or conversational understanding applications or services. In examples, processing devices may have access to or store dialog processing applications that may incorporate the universal hypothesis ranking model. For instance, a processing device may execute an application for dialog processing, wherein execution of the application for dialog processing may comprise displaying a graphical user interface. In some examples, execution of the application for dialog processing may comprise presenting, through the graphical user interface, natural language phrases that are displayable on the processing device and/or spoken to a user of the processing device executing the application for dialog processing.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system comprising:
   at least one processor; and
   a memory operatively connected with the processor, wherein the memory stores computer-executable instructions, that cause the processor to perform:
   analyzing a corpus of training data, wherein the corpus of training data comprises data received in a plurality of different languages;
   creating, based on the analyzed corpus of training data, a language-independent feature set that includes selectable features for ranking of dialog hypotheses; and
   training a single model using the language-independent feature set to generate a universal hypothesis ranking model, wherein the universal hypothesis ranking model is applicable to a plurality of languages and locales, and wherein the universal hypothesis ranking model is configured to rank hypotheses for user input received in a language previously unseen by the universal hypothesis ranking model.

2. The system according to claim 1, wherein the data for the plurality of different languages is obtained from two or more language-specific dialog application components stored in a memory of one or more processing devices.

3. The system according to claim 1, wherein the computer-executable instructions further comprise an instruction that causes the processor to perform storing the universal hypothesis ranking model in a memory of at least one processing device.

4. The system according to claim 1, wherein the computer-executable instructions further comprise an instruction that causes the processor to perform providing the generated universal hypothesis ranking model as at least one from a group consisting of: a file, a distributable package, and an application, for distributed access to a plurality of processing devices in a distributed network, and wherein the plurality of processing devices execute at least one application for dialog processing.

5. The system according to claim 4, wherein the computer-executable instructions further comprise an instruction that causes the processor to perform:
receiving, over the distributed network from another processing device, a received input from the application for dialog processing,
generating, a plurality of dialog hypotheses in response to performing language understanding processing on the received input,
ranking the plurality of dialog hypotheses using the universal hypothesis ranking model, and
transmitting one or more of the ranked dialog hypotheses to the another processing device over the distributed network.

6. The system according to claim 5, wherein the ranking further comprises extracting a selectable feature set comprising two or more features from the language-independent feature set, and analyzing a dialog hypothesis of the plurality of dialog hypotheses using the extracted selectable feature set.

7. The system according to claim 1, wherein the computer-executable instructions further comprise an instruction that causes the processor to perform:
integrating the universal hypothesis ranking model into at least one application for dialog processing,
storing the at least one application for dialog processing in the memory, and
executing the application for dialog processing, wherein the executing further comprises:
displaying, on a display of a processing device, a graphical user interface, and
presenting, through the graphical user interface, natural language phrases that are displayed on the processing device and spoken to a user.

8. The system according to claim 7, wherein the computer-executable instructions further comprise an instruction that causes the processor to perform:
receiving, through the user interface, an input,
generating, using the application for dialog processing, a plurality of dialog hypotheses in response to performing language understanding processing on the received input,
ranking the plurality of dialog hypotheses using the universal hypothesis ranking model, and
outputting one or more of the ranked dialog hypotheses for display through the user interface.

9. The system according to claim 8, wherein the ranking further comprises extracting a selectable feature set comprising two or more features from the language-independent feature set, and analyzing a dialog hypothesis of the plurality of dialog hypotheses using the extracted selectable feature set.

10. A computer-implemented method comprising:
receiving an input through a user interface of an application for dialog processing;
generating a plurality of dialog hypotheses based on input understanding processing of the received input; and
ranking the plurality of dialog hypotheses using a universal hypothesis ranking model that is applicable to a plurality of languages and locales, wherein the universal hypothesis ranking model is configured to rank hypotheses for user input received in a language previously unseen by the universal hypothesis ranking model;
wherein the ranking comprises:
applying the universal hypothesis ranking model to analyze language independent features of the plurality of dialog hypotheses extracted by the universal hypothesis ranking model; and
outputting a ranking of the plurality of dialog hypotheses for policy determination.

11. The computer-implemented method according to claim 10, wherein the generating of the dialog hypotheses further comprises executing a knowledge fetch to analyze semantic frame data generated by language understanding processing, and wherein the executed knowledge fetch uses knowledge data obtained from at least one database to analyze the semantic frame data.

12. The computer-implemented method according to claim 10, further comprising executing a policy determination that outputs one or more of the ranked plurality of dialog hypotheses.

13. The computer-implemented method according to claim 12, wherein the ranking further comprises extracting a plurality of language independent features for each of the plurality of dialog hypotheses, and scoring the plurality of dialog hypotheses based on analyzing the extracted features using training data of the universal language model, wherein the training data comprises data obtained from user input received in a plurality of different languages.

14. The computer-implemented method according to claim 12, further comprising:
during processing of the received input, retaining data associated with one or more selected from a group consisting of input recognition processing, input understanding processing and dialog processing,
receiving a subsequent input, and
utilizing the retained data to enhance processing of the subsequent input during at least one selected from group consisting of input recognition processing, input understanding processing and dialog processing.

15. A system comprising:
at least one processor; and
a memory operatively connected with the processor, wherein the memory stores computer-executable instructions, that cause the processor to perform:
receiving an input through a user interface of an application for dialog processing,
generating a plurality of dialog hypotheses based on input understanding processing of the received input, and
ranking the plurality of dialog hypotheses using a universal hypothesis ranking model that is applicable to a plurality of languages and locales, wherein the universal hypothesis ranking model is configured to rank hypotheses for user input received in a language previously unseen by the universal hypothesis ranking model;
wherein the ranking comprises:
applying the universal hypothesis ranking model to analyze language independent features of the plurality of dialog hypotheses extracted by the universal hypothesis ranking model; and outputting a ranking of the plurality of dialog hypotheses for policy determination.

16. The system according to claim 15, wherein the generating of the dialog hypotheses further comprises executing a knowledge fetch to analyze semantic frame data generated by language understanding processing, wherein the executed knowledge fetch uses knowledge data obtained from at least one database to analyze the semantic frame data.

17. The system according to claim 15, wherein the computer-executable instructions further comprise an instruction that causes the processor to perform executing a policy determination that outputs one or more of the ranked plurality of dialog hypotheses.

18. The system according to claim 17, wherein the ranking further comprises extracting a plurality of language independent features for each of the plurality of dialog hypotheses, and scoring the plurality of dialog hypotheses based on analyzing the extracted features using training data of the universal hypothesis ranking model, wherein the training data comprises data obtained from user input received in a plurality of different languages.

19. The system according to claim 17, wherein the computer-executable instructions further comprise an instruction that causes the processor to perform: during processing of the received input, retaining data associated with one or more selected from a group consisting of input recognition processing, input understanding processing and dialog processing.

20. The system according to claim 19, wherein the computer-executable instructions further comprise an instruction that causes the processor to perform: receiving a subsequent input, and utilizing the retained data to enhance processing of the subsequent input during at least one selected from group consisting of input recognition processing, input understanding processing and dialog processing.

* * * * *